United States Patent [19]

Smith et al.

[11] Patent Number: 5,766,474

[45] Date of Patent: Jun. 16, 1998

[54] BIOMASS IMPOUNDMENT MANAGEMENT SYSTEM FOR PURIFYING WATER

[75] Inventors: Stephen Winslow Smith, Aurora; Richard Lee Randall, Littleton, both of Colo.

[73] Assignee: Landmark Reclamation, Inc., Denver, Colo.

[21] Appl. No.: 637,427

[22] Filed: Apr. 25, 1996

Related U.S. Application Data

[62] Division of Ser. No. 388,754, Feb. 15, 1995, Pat. No. 5,528,856.

[51] Int. Cl.$^6$ ............................................. C02F 3/32
[52] U.S. Cl. ........................... 210/602; 210/747; 210/170
[58] Field of Search ............................... 210/602, 747, 210/170

[56] References Cited

U.S. PATENT DOCUMENTS

| | | | |
|---|---|---|---|
| 3,385,786 | 5/1968 | Klock | 210/12 |
| 3,955,317 | 5/1976 | Gudin | 47/1.2 |
| 4,086,161 | 4/1978 | Burton | 210/13 |
| 4,159,629 | 7/1979 | Korr et al. | 60/641 |
| 4,169,050 | 9/1979 | Serfling | 210/12 |
| 4,324,067 | 4/1982 | Kessler | 47/1.4 |
| 4,333,263 | 6/1982 | Adey | 47/1.4 |
| 4,415,450 | 11/1983 | Wolverton | 210/602 |
| 4,487,588 | 12/1984 | Lewis, III et al. | 441/43 |
| 4,536,988 | 8/1985 | Hogen | 47/1.5 |
| 4,888,912 | 12/1989 | Murray | 47/1.4 |
| 5,010,837 | 4/1991 | Hirose | 114/256 |
| 5,078,882 | 1/1992 | Northrop | 210/747 |
| 5,096,577 | 3/1992 | Ngo et al. | 210/170 |
| 5,106,504 | 4/1992 | Murray | 210/602 |
| 5,121,708 | 6/1992 | Nuttle | 47/1.4 |
| 5,137,625 | 8/1992 | Wolverton | 210/602 |
| 5,174,897 | 12/1992 | Wengrzynek | 210/602 |
| 5,344,557 | 9/1994 | Scanzillo | 210/94 |

FOREIGN PATENT DOCUMENTS 63-209794  8/1988  Japan.

OTHER PUBLICATIONS

Gotaas, Oswald, Ludwig, Photosynthetic Reclamation of Organic Wastes, The Scientific Monthly, p. 371, Dec. 1954.
Sales publication by Limnion Corp. regarding "Submersed" Vegetation Management, including 2 drawings.
Univ. of Florida, "Aquatic Plant Filter System Receives Patent," Aquaphyte, vol. 12, No. 2, p. 7 (Fall 1992).

Primary Examiner—Christopher Upton
Attorney, Agent, or Firm—Dorr, Carson, Sloan & Birney, P.C.

[57] ABSTRACT

A biomass management system using sunlight during the daytime for purifying water having impurities. The biomass management system of the present invention is adapted for use in an impoundment holding water which has an inlet for delivering impure water into the impoundment and an outlet for delivering purified water out of the impoundment. A first type of rooted bottom dwelling plant grows on the bottom of the impoundment and removes some of the impurities in the water. A plurality of elongated channels float on the surface of the water in the impoundment above the bottom dwelling plants. Each of the plurality of the elongated channels are secured in the impoundment in a substantially North-South orientation. Each of the plurality of elongate channels have a holding region with inwardly shaped sides. A second type of floating rootless plant grows in the holding region on the surface of the water in each of the channels and removes some of the impurities in the water. The North-South orientation of the elongated channels and their inwardly shaped sides of the channels allow sunlight to be delivered to all of the bottom dwelling plants.

2 Claims, 7 Drawing Sheets

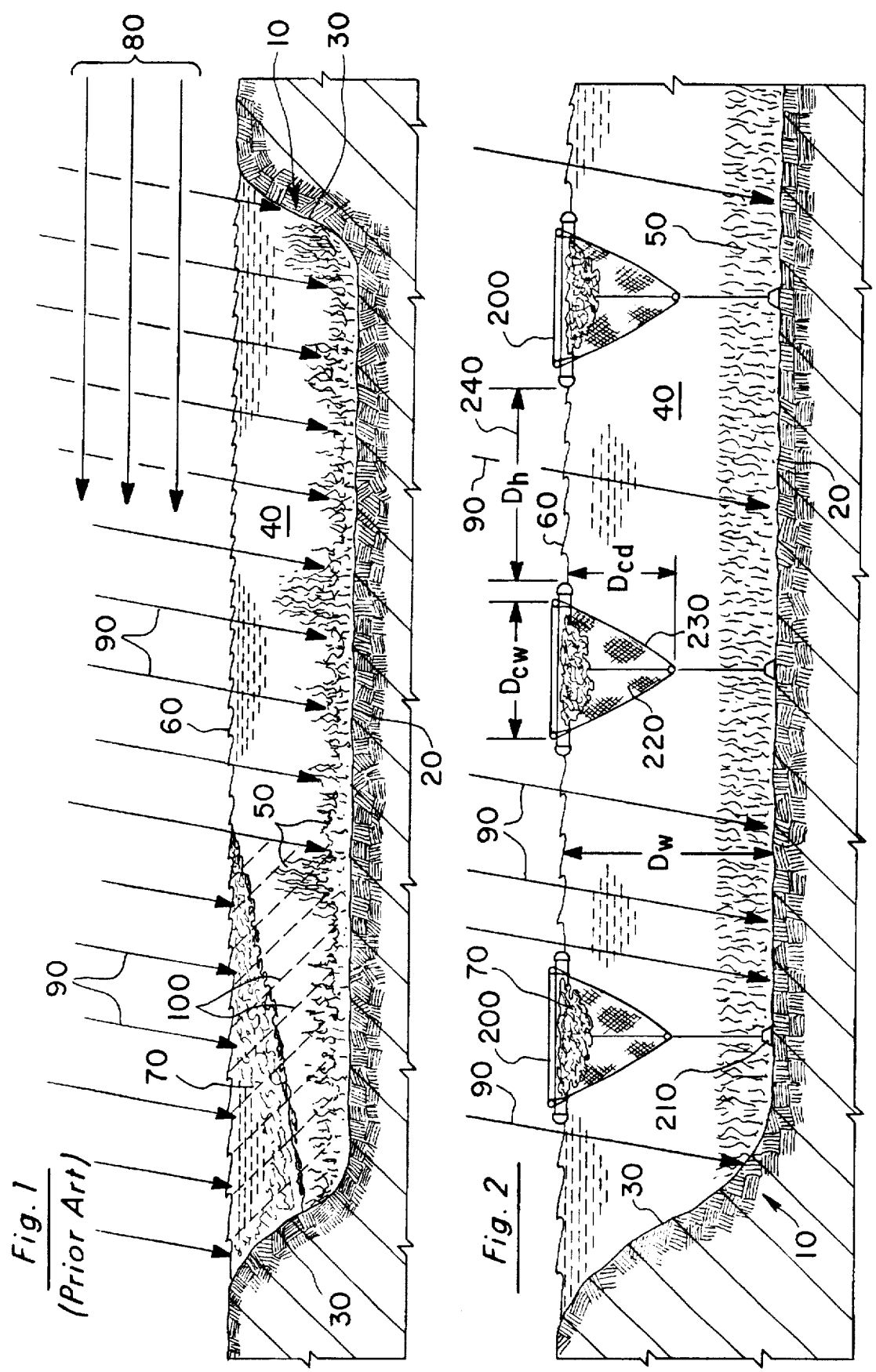

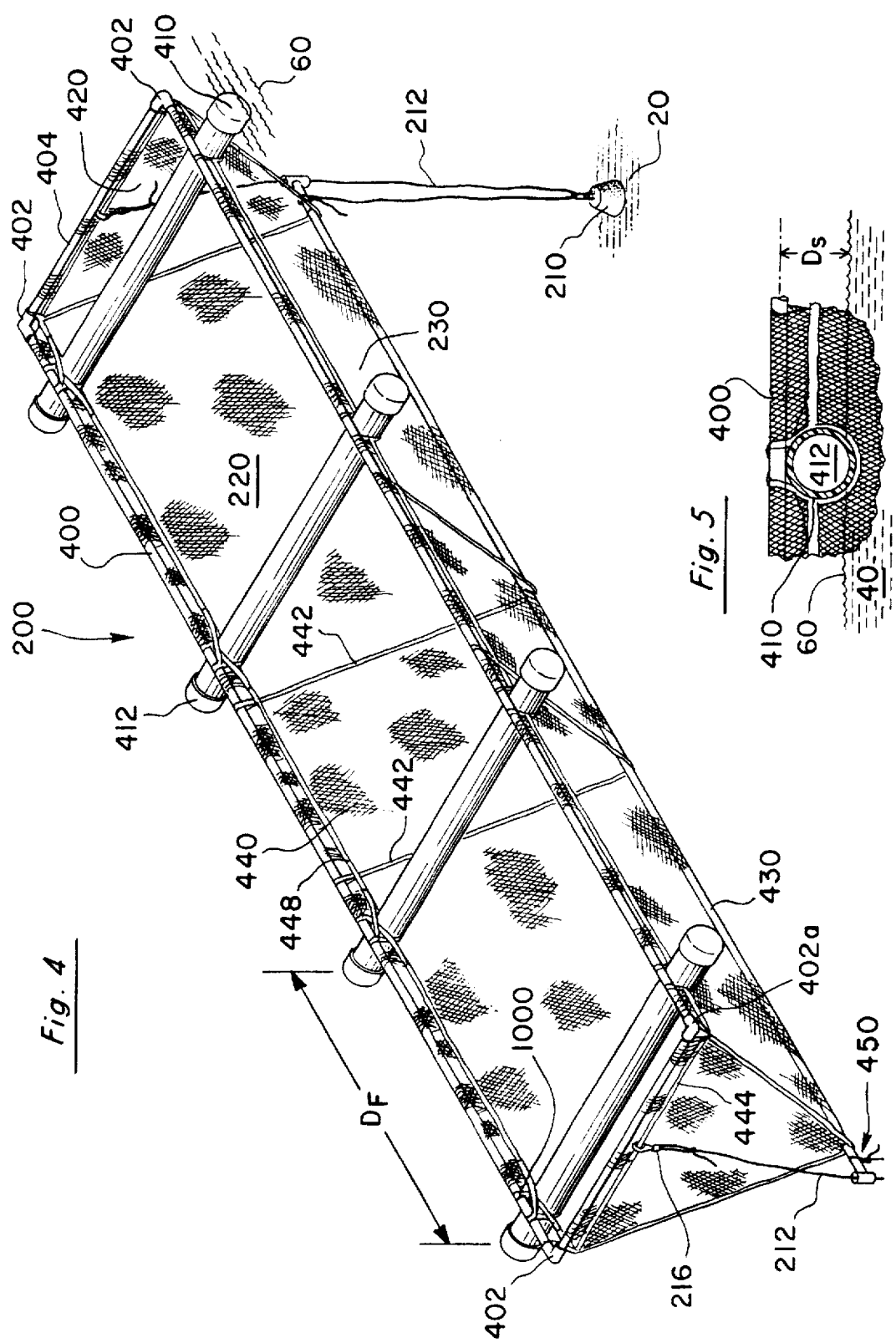

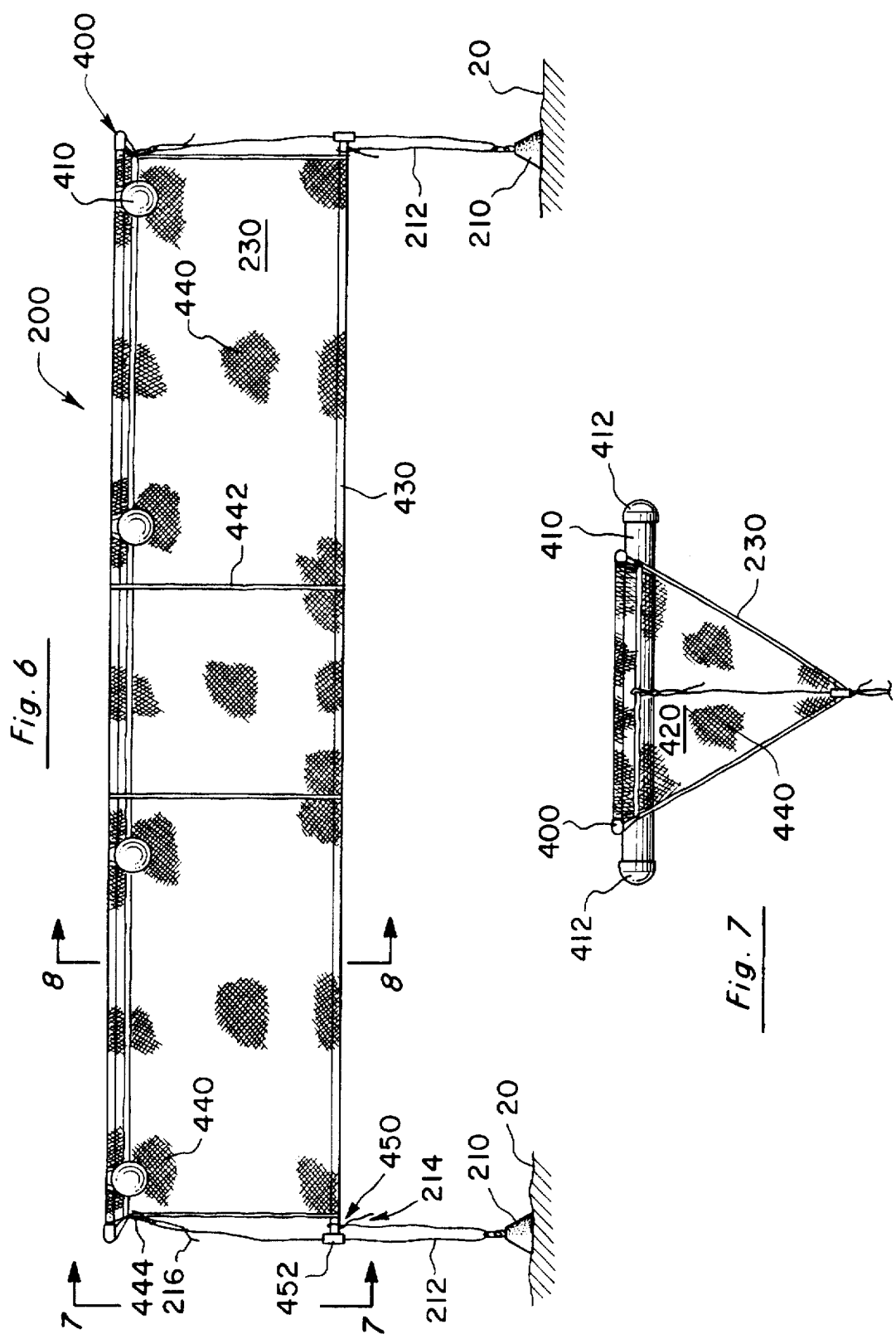

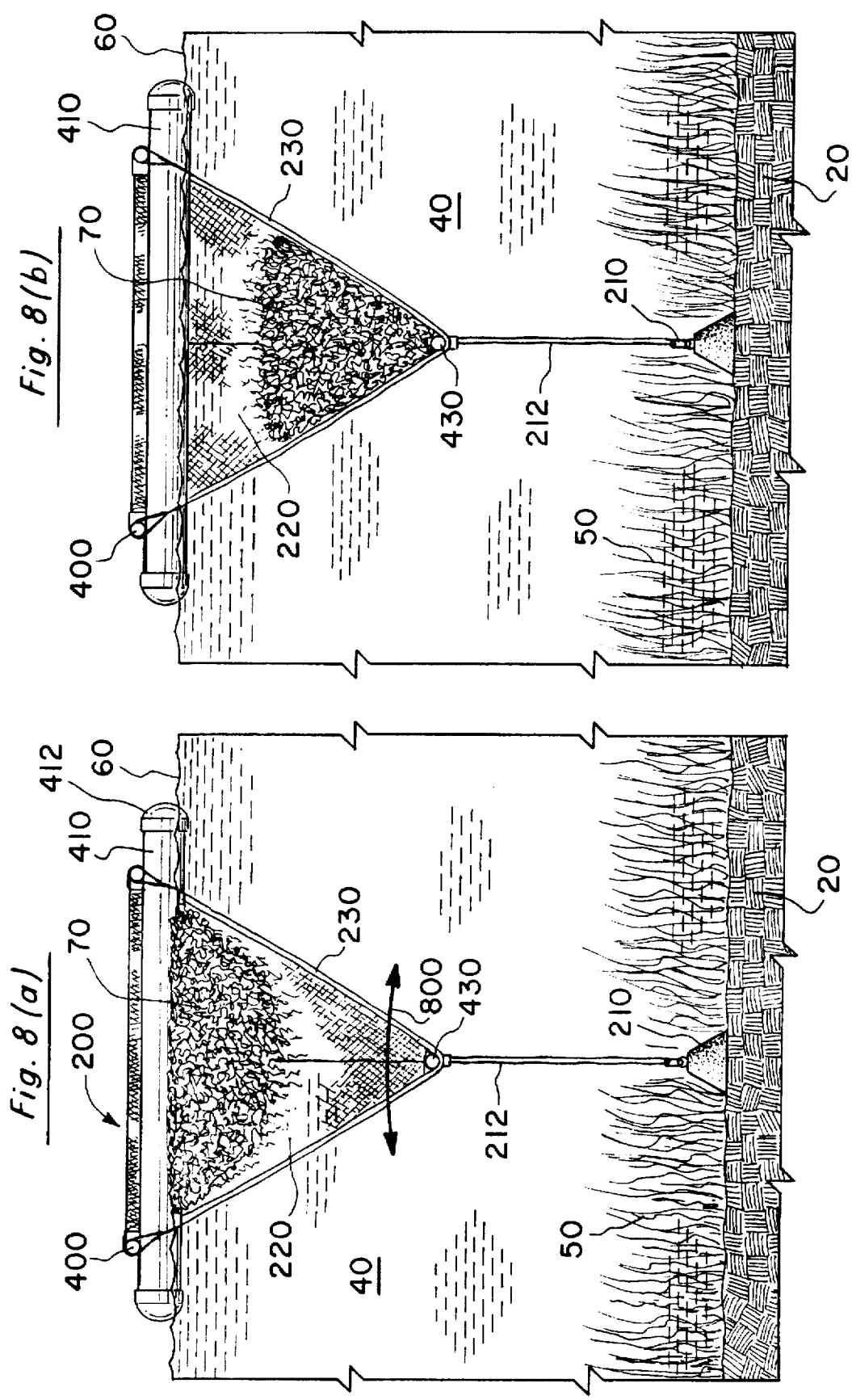

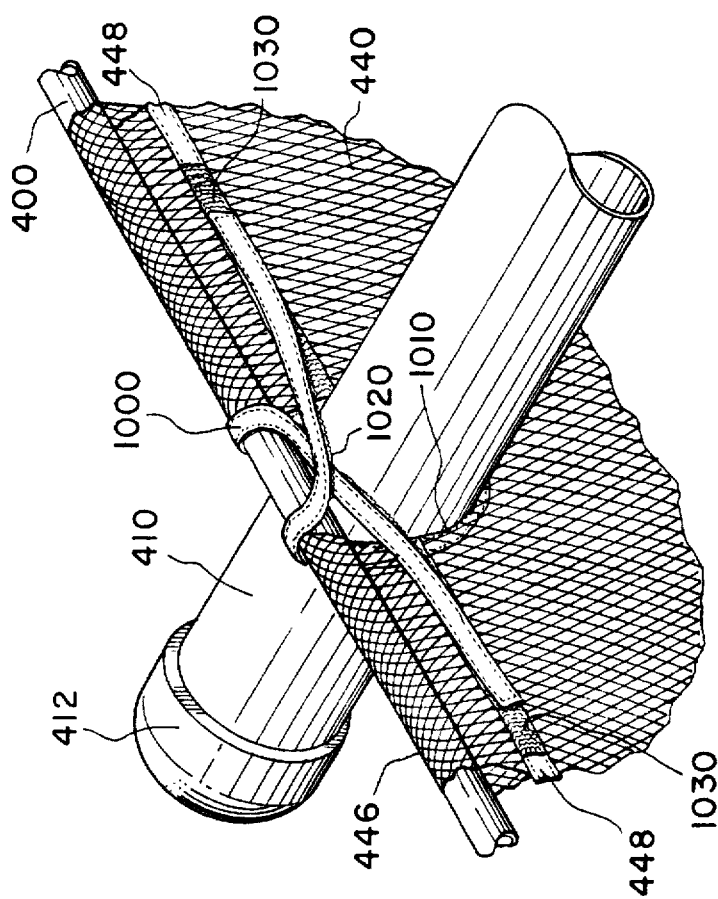
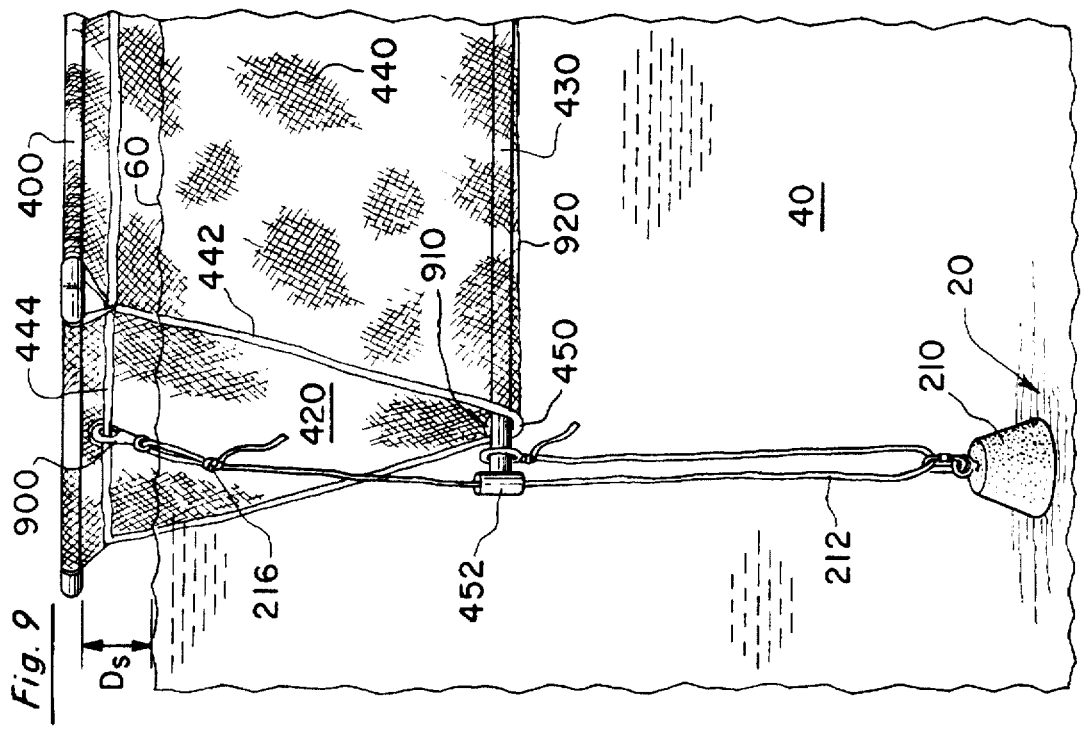
Fig. 10
Fig. 9

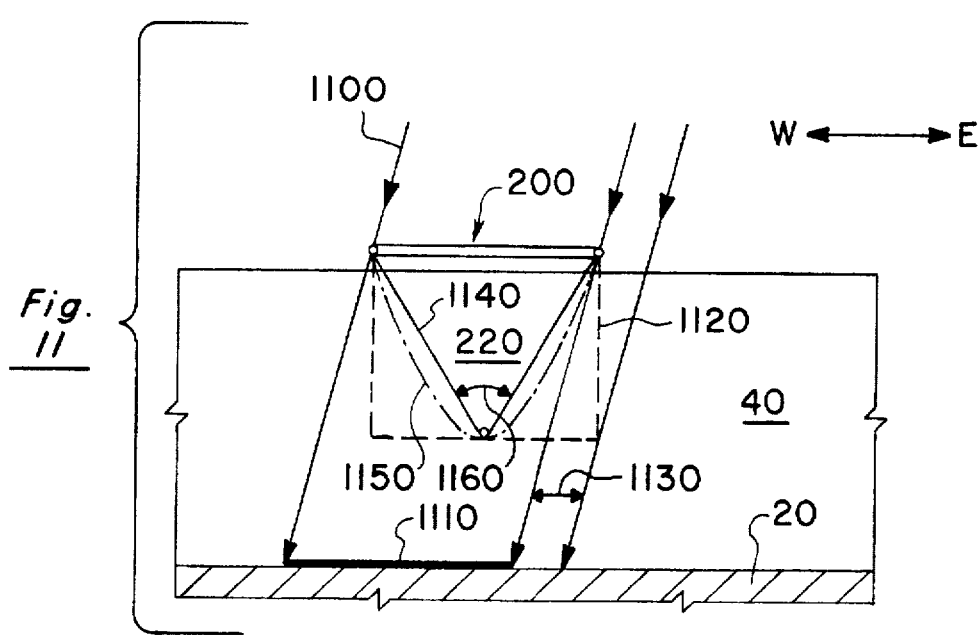
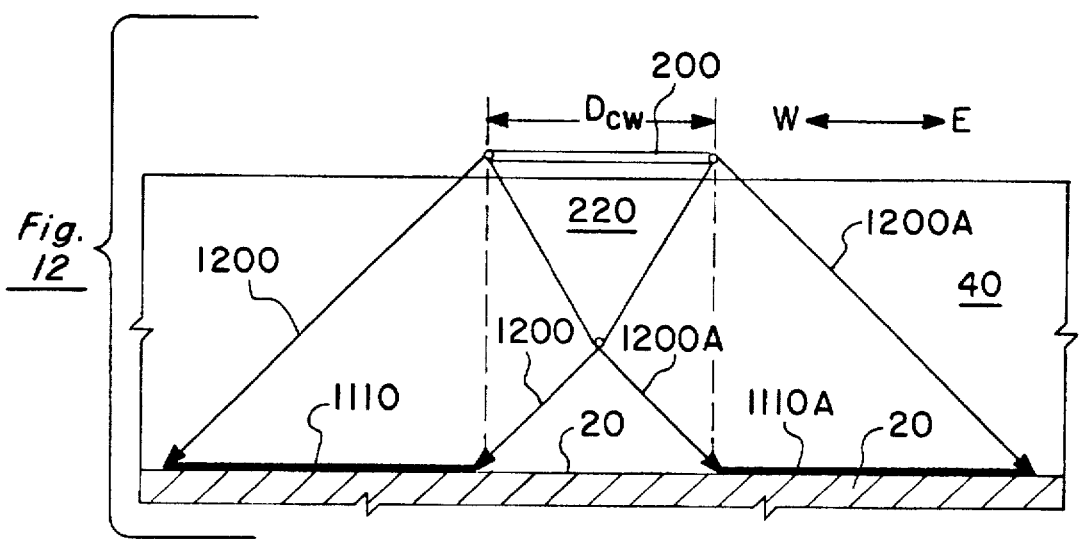
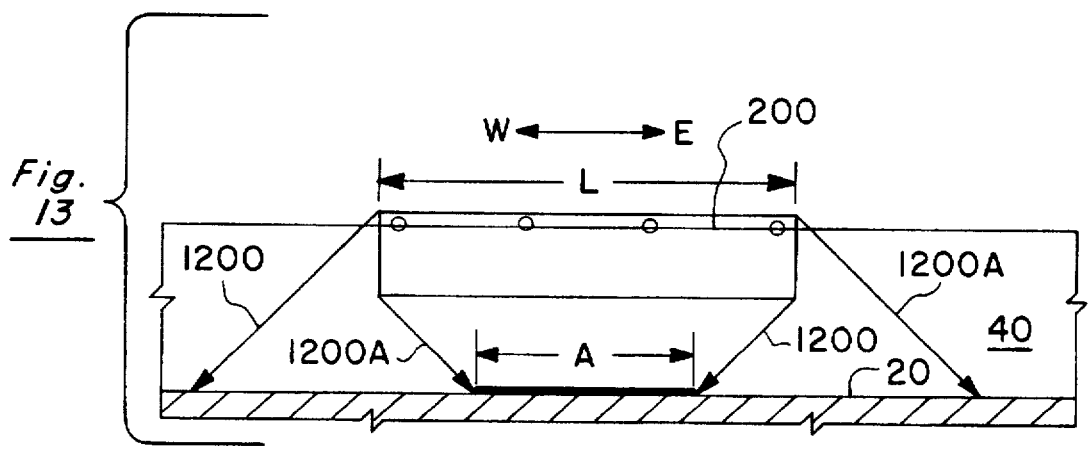

BIOMASS IMPOUNDMENT MANAGEMENT SYSTEM FOR PURIFYING WATER

This is a divisional of application Ser. No. 08/388,754 filed on Feb. 15, 1995, now U.S. Pat. No. 5,528,856.

BACKGROUND OF THE INVENTION

1. Field of the Invention

The present invention relates to the field of purifying water and, more particularly, to systems and methods utilizing biomass such as aquatic plants in an impoundment for purifying impurities in water.

2. Statement of the Problem

A need exists for a dense biomass system for controlling impurities in water impoundments such as ammonia, nitrogen, phosphorous, and heavy metals. The benefits of using a biomass to purify water are well known. For example, as ammonia is converted into nitrogen in a body of water, often dissolved oxygen levels are depleted resulting in the death of fish and aquatic plants. When nitrogen and/or phosphorous are present in water, algae blooms can occur because the nitrogen and phosphorous are a primary food source for various undesirable algae species. Heavy metals within a water body often make it unsafe for drinking. Biomass management systems are used for managing aquatic plants in water impoundments such as ponds, lakes, runoff basins, etc. The type and quantity of plants are designed and controlled in an impoundment to consistently absorb nitrogen, phosphorous and heavy metals. The aquatic plants also provide a net increase in the dissolved oxygen level if managed properly. If aquatic plants are left unmanaged, they will "take over" a body of water and the plants may begin to die and then compound the problems with respect to impurities in the water.

In one prior art approach, as represented by U.S. Pat. Nos. 4,888,912 and 5,106,504, phytocompatible containers are utilized to enclose non-rooted "submersed" aquatic plants below the surface of the water in the photic zone of the impoundment. The "submersed" aquatic plants extract nutrients and trace metals from the water. The phytocompatible containers are used in conjunction with rooted "submersed" vegetation that extracts nutrients and trace metals. Such phytocompatible containers are designed to remain out of sight and submerged below the surface of the water. In this submersed design separate regions in the impoundment are required, one elevated plateau region (7 feet deep) for the rooted submersed plants and a second deeper perimeter trench (8–20 feet deep) for the submerged non-rooted plants. The perimeter trench also attracts colder water which tends to sink and to displace the warmer water to the center plateau surface where it enhances plant growth. The submerged containers are designed to fully contain the non-rooted submerged plants including the propagating portions. The harvest of the submerged rooted and non-rooted of plants occur periodically. With the harvesting the impurities collected by the plants are removed in the harvested plants. The plateau region can be harvested with harvest machines. The containers must be lifted out of the water and opened for harvesting.

U.S. Pat. No. 4,536,988 to Hogen sets forth an aquatic biomass containment barrier. The '988 patent sets forth a floating containment barrier grid structure for containing floating aquatic plants in a body of water. The floating structure is anchored by cables and stakes to the impoundment. The '988 patent is designed to grow floating aquatic plants only. In the preferred embodiment, duckweed is grown to remove unwanted nutrients from the water. The duckweed is periodically harvested. The '988 structure is designed to enable the large scale growing of duckweed as a cash crop and is designed to slightly submerge when a harvester or barge harvests the duckweed. Thin plastic sheets are used to construct the grid structure and to contain the duckweed in individual interconnected square barrier segments. Each barrier segment has a wave barrier so as to prevent the duckweed from one segment from blowing or riding a wave into the next segment.

U.S. Pat. No. 5,010,837 to Hirose sets forth a floating marine paddy farm which provides a floating raceway that secures the ocean water from the fresh water in a buoyant support. On the surface of the fresh water hydroponic paddy rice plants can be grown.

The article by Gotaas, et al., *Photosynthetic Reclamation of Organic Waste*, The Scientific Monthly, pp. 368–372 (Dec. 1954) discusses the advantages of using biomass material to purify water. This article also discusses the advantages of orienting the tanks in the North-South direction in order for the tanks to receive direct sunlight throughout the day.

In U.S. Pat. No. 4,333,263 "Algal Turf Scrubber", it is recognized that wave action can increase biomass productivity. The '263 patent sets forth an algal scrubber which includes a wave generating mechanism.

A need exists for a dense biomass management system which utilizes both floating non-rooted plants and bottom dwelling rooted plants in the same region of the impoundment to maximize the density of the biomass and so that the different types of plants can be designed and managed to control the particular impurities in the water. The addition of floating plants over the bottom dwelling plants must occur without causing the bottom growing plants to be excessively shaded (and, therefore, not thriving) and to enable both types of plants to be easily harvested. Finally, the system should permit wave action to occur on the floating plants to increase productivity.

3. Solution to the Problem

The present invention sets forth a biomass management system that allows rooted bottom dwelling plants to grow and remain healthy on the bottom of a water impoundment while allowing rootless floating plants to grow and remain healthy above them.

The present invention allows the non-rooted, floating plants to be contained in a large surface area provided by elongated channels where they would naturally occur and thrive. The unique elongated channels of the present invention allow the water to pass through the net of the channel and further allows waves on the surface to agitate the floating plants to increase productivity and to circulate the surface water within the channel, thereby preventing a stagnate surface area from developing. Furthermore, the system allows the sunlight to reach the bottom dwelling plants while containing the floating plants so that they cannot take over the surface. The elongated channels of the present invention can be linked together as needed to provide the correct amount of rootless, floating aquatic plants with the correct amount of bottom dwelling plants to properly manage the nutrient loading of the water impoundment.

The system of the present invention is designed to work in harmony with the daytime path of the sun, if required, to maximize the amount of sunlight penetrating under the floating channels to the bottom dwelling plants from morning to evening. The floating channels of the present inven-

3 tion are designed to keep the rootless, floating aquatic plants at the surface in their natural habitat for optimum growth characteristics and for ease of access for maintenance.

Finally, harvesting of the bottom dwelling plants can occur in a conventional manner while the floating plants in the channels can be harvested from alongside or above the channels.

SUMMARY OF THE INVENTION

A biomass management system using sunlight for purifying water having impurities is disclosed. The biomass management system of the present invention is adapted for use in an impoundment holding water. The impoundment has an inlet for delivering impure water into the impoundment and an outlet for delivering purified water out of the impoundment.

A first type of plant, a rooted bottom dwelling plant, grows on the bottom of the impoundment. The bottom dwelling plant removes some of the impurities in the water. A plurality of elongated channels float on the surface of the water in the impoundment above the bottom dwelling plants. Each of the plurality of the elongated channels are secured in the impoundment in a substantially North-South orientation. Each of the plurality of elongate channels have a holding region with inwardly shaped sides. A second type of plant, a floating rootless plant, grows in the holding region on the surface of the water in each of the channels. The floating plants remove some of the impurities in the water. The North-South orientation of the elongated channels and their inwardly shaped sides of the channels allow sunlight to be delivered during the daytime to the bottom dwelling plants. Hence, the bottom dwelling plants and the floating plants grow together in the same region to remove impurities from the water. The biomass management system of the present invention achieves a greater density of biomass plants per volume of water through the use of floating and rooted plants than conventional systems. It also allows the ratio of floating to rooted plants to be optimized for the particular impurities to be removed as using two species together will increase the overall spectrum of uptake rates of various impurities in the water impoundment.

Each channel is designed to contain the floating rootless plants above the surface of the water so that wave action can enter the holding region to agitate the floating plants to increase productivity and to cause circulation at the surface.

BRIEF DESCRIPTION OF THE DRAWING

FIG. 1 is an illustration showing the cross section of a conventional impoundment such as a pond having naturally growing bottom plants and floating plants.

FIG. 2 is an illustration, in cross section, showing elongated channels of the present invention floating on the surface of the water in an impoundment.

FIG. 4 is a perspective view of the elongated channel of the present invention.

FIG. 5 is a side planar view of the portion of the elongated channel of FIG. 4 pertaining to the floating member.

FIG. 6 is a side planar view of the elongated channel of FIG. 4.

FIG. 7 is the end planar view of the elongated channel of FIG. 4.

FIGS. 8(a) and 8(b) are cross sectional views of the elongated channel of FIG. 6.

4

Figure 3:
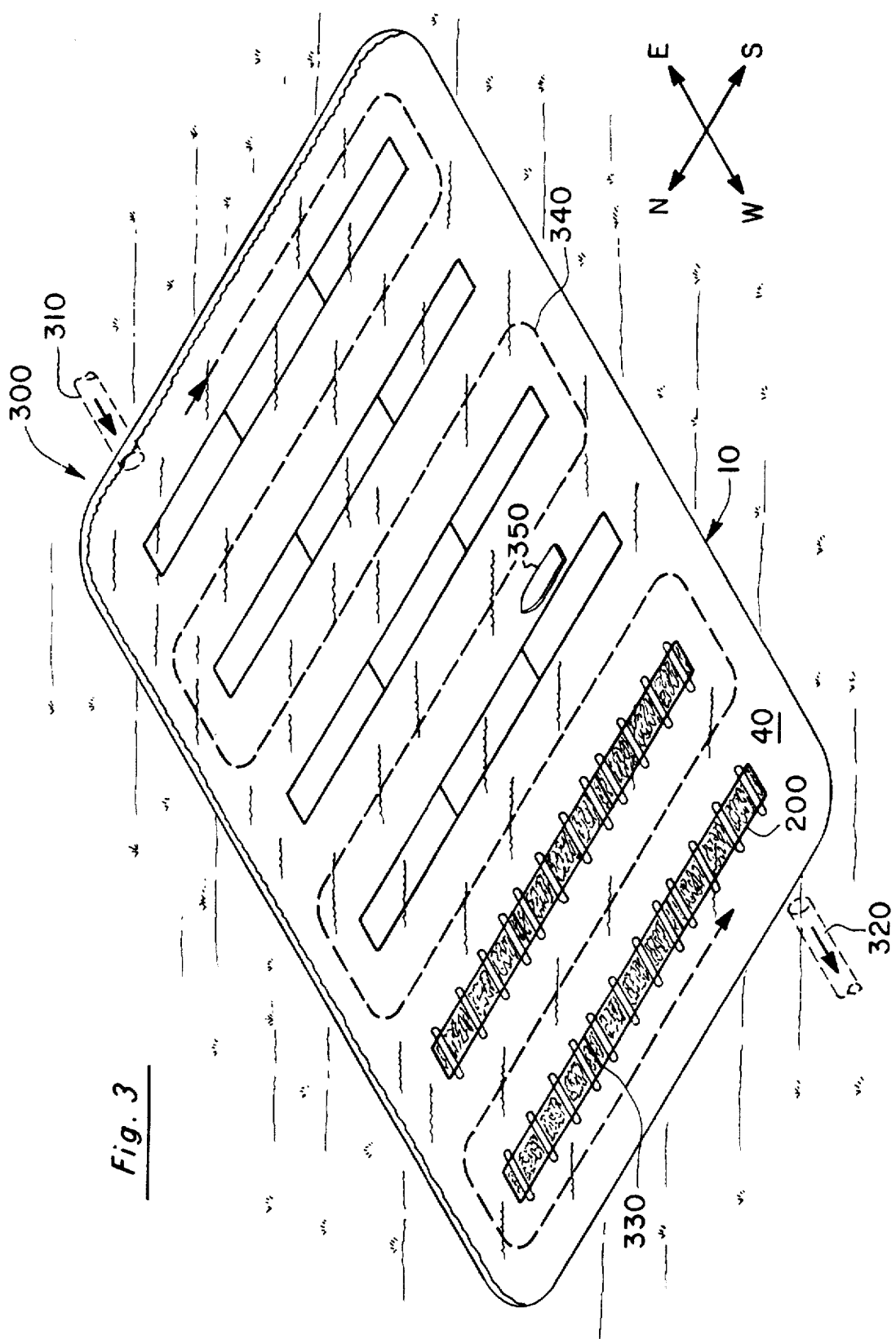
FIG. 3 sets forth an illustration of the entire impoundment of FIG. 2 viewed from above.

FIG. 9 is a partial perspective view illustrating the securing of the elongated float of FIG. 4 in the impoundment.

FIG. 10 is a partial perspective view setting forth the connection of the upper support frame to the lower floating member.

FIG. 11 is an illustration showing the interaction of the elongated channel of the present invention in a North-South direction with rays of sunlight.

FIG. 12 is an illustration showing the elongated channel of FIG. 11 allowing sunlight to fall on bottom dwelling plants during the daytime.

FIG. 13 is an illustration showing the interaction with the elongated channel of the present invention oriented in an East-West direction.

DETAILED DESCRIPTION OF THE INVENTION

1. Overview

In FIG. 1, a conventional impoundment 10 such as a pond has a bottom 20 and sides 30. The impoundment 10 contains water 40. A first type of plant 50 grows on the bottom 20. Floating on the surface 60 of water 40 is a second type of plant 70. In a typical conventional impoundment 10 of FIG. 1 where both types of plants naturally occur, floating plants 70 occupy different regions of water 40 especially when wind 80 is blowing as illustrated. When wind 80 is blowing, the surface plants 70 move towards the leeward side of sides 30. The first type of plant 50 and the second type of plant 70 through photosynthesis convert and/or absorb impurities in the water 40 so, over time, the water 40 becomes less impure. The rays of sun are shown as arrows 90. In the embodiment of FIG. 1, the rays of sun 90 impact on the first type of bottom dwelling plants 50 causing them to grow and through photosynthesis clear the impurities in the water 40. Unfortunately, the second type of plant 70, which floats on the surface, shades 100 the bottom plants 50 underneath and may cause the bottom plants 50 to deteriorate and perhaps die especially if the floating plants 70 are in a stationary location in the impoundment 10.

In such a preferred conventional impoundment 10, the bottom plants 50 prefer a depth from the surface 60 of the water 40 to the bottom 20 in the range of about 4 feet to 10 feet. As shown in FIG. 1, the bottom growing plants 50 normally grow to different heights and, can in fact, take over the impoundment 10. To prevent the bottom dwelling plants 50 from taking over the impoundment 10, such bottom dwelling plants 50 from time to time must be harvested. The floating plants 70 in such a conventional impoundment actually inhibit the growth of the bottom plants 50 and, therefore, are undesirable.

Where the preferred conventional impoundment 10 is utilized for water purification, the bottom dwelling plants 50 are selected to remove the impurities in the water. The surface 60 of the water above the bottom dwelling plants 50 is kept free of floating plants 70 so that the sunlight 90 is evenly distributed through the daytime over the bottom dwelling plants 50 for sustained growth.

The system of the present invention as shown in FIGS. 2 and 3 uses sunlight 90 for purifying water containing impurities. The system makes use of a plurality of elongated channels 200 floating on the surface 60 of the water 40. Each of the plurality of channels 200 is secured to the impoundment 10, in the preferred embodiment, by an anchor 210 connected to the channel 200. As shown in FIG. 3, each channel 200 is secured to the impoundment 10 in substantially a North-South orientation. Furthermore, each channel as shown in FIG. 2 has a holding region 220 with elongated inwardly shaped sides 230. As will be discussed in greater detail, by orienting the channel 200 in substantially a North-South orientation and by providing inwardly shaped sides 230, the present invention allows sunlight 90 to be delivered to all of the bottom dwelling plants 50 at sometime during the course of the day.

Hence, under the teaching of the present invention, the system 300, as shown in FIG. 3, through the use of a plurality of channels 200 increases the ability of the impoundment 10 to purify the impurities in the water by adding additional purification capacity by the additional biomass provided by the surface plants 70 to remove impurities in a design that still allows sunlight to the bottom dwelling plants 50 during the daytime. Hence, the system 300 of the present invention permits the bottom dwelling plants to receive sunlight 90 while adding surface dwelling plants 70 to increase the biomass capacity per volume of water.

As shown in FIG. 2, the channels 200 are separated by a predetermined distance $D_h$. Each channel 200 has a width, $D_{cw}$ and a depth $D_{cd}$. The depth of the water $D_w$ is preferably about 6 to 10 feet.

Hence, in the preferred embodiment of the system 300 of the present invention and as shown in FIG. 2, each channel has a width, $D_{cw}$, of preferably 5 feet and a depth, $D_{cd}$ of about 4⅓ feet. The distances between the channels 200, $D_h$, is preferably a multiple of the width of a conventional harvesting machine (not shown). Hence, if a standard harvesting machine has a width of 8 feet then $D_h$ should be 8 feet or 16 feet. It is to be understood that any suitable distance $D_h$ could be used under the teachings of the present invention.

In summary, and shown in FIGS. 2 and 3, a biomass management system 300 using sunlight 90 is set forth for purifying water 40 containing impurities. The system 300 of the present invention provides an impoundment 10 for holding the water 40. The impoundment 10 has a bottom 20 and sides 30. An inlet 310 is provided in the impoundment 10 for introducing or delivering water 40 containing impurities into the impoundment 10. An outlet 320 is also provided for removing or delivering purified water out of the impoundment 10. The design of the inlet 310 and the outlet 320 is a matter of design choice and is not critical to the teachings of the present invention. The water being delivered out is purer, hence purified, than the less pure or contaminated water being delivered in. The rooted bottom dwelling plants 50 are selected to specifically remove some of the impurities from the water 40. A plurality of elongated channels 200 float on the surface 60 of the water 40 in the impoundment 10. Each of the plurality of channels 200 is secured 210 in the impoundment 10. The channels 200 are oriented in a substantially North-South direction. Each of the channels 200 has a holding region 220 with elongated inwardly shaped sides 230. The floating plants 70 are confined within the holding region 220 and act to remove some of the impurities from the water. The holding region 220 has its greatest area at the surface 60 of the water 40 so as to maximize the surface area available for the floating plants. The plurality of channels 200 in the North-South orientation along with the inwardly shaped sides 230 allow sunlight 90 to reach all of the bottom plants 50 during the daytime. The processing capacity of a conventional impoundment as shown in FIG. 1 is increased by providing floating plants 70 as well as bottom plants 50 over the same region.

2. Details of Channel 200 In FIGS. 4–8 the details of a channel 200 of the present invention are set forth. Each channel 200 has a support frame 400 that is substantially rectangular in shape, support members 410 that float on the surface of the water 40, a holding region 220 that is formed between inwardly directed sides 230 and ends 420, an anchor 210, and a lower member 430.

In the preferred embodiment, the sides 230 and the ends 420 are made of a net material 440 to contain the floating plants 70. The net 440 does not contain the propagating portions of the plant 70, and it is not a goal of the present invention to contain the propagating portions of the plant 70 in the holding region 220. If desirable, the propagating portions of the floating plants can be easily screened at the outlet 320 with conventional screen mechanisms, not shown. Based upon the width of conventional netting, the netting 440 has seams 442 so that the channel 200 can be of any elongated length desired. Hence, while four support members 410 are shown it is to be expressly understood that any number of support members could be provided under the teachings of the present invention. Each channel 200 is secured to the bottom 20 of the impoundment by means of an anchor 210 which is connected by a rope 212 to the bottom member 430. This holds the bottom member 430 in a downward direction towards the bottom 20 of the impoundment. This is best shown in FIG. 9.

In the preferred embodiment support members 410 are constructed of 6 inch diameter polyvinylchloride ("PVC") piping having end caps 412 affixed over the ends as to prevent water from entering the interior of the pipe 410. PVC pipe is commonly available, but it is to be understood that similar materials could also be used. The diameter of the support member can be in a range of 4–10 inches depending in part upon the wave size in the impoundment. As shown in FIG. 4, these support members 410 are separated by distance DF which in the preferred embodiment is 5 feet 4 inches. It is to be expressly understood that any suitable distance could be provided under the teachings of the present invention.

In FIG. 5, the support member 410 holds the frame 400 a predetermined distance, $D_s$, above the surface 60 of the water 40. In the preferred design, $D_s$, is six inches, but this can be suitably varied depending upon the impoundment 10 design considerations. This permits wave action from the surface 60 of the water 40 to enter into the holding region 220 so as to provide agitation to the floating rootless plants 70 without releasing the floating non-rooted plants 70 from the holding region 220. The wave action is optional to the teachings of the present invention and prevents the water in the holding region from becoming stagnant so as to increase the productivity of the floating plants.

The frame 400 is also constructed of PVC pipe having preferably a one inch diameter. Again any suitable diameter PVC pipe can be used. Frame 400 is shown in FIG. 4 connected with right angle joints 402, which can be glued or which can screw to the PVC piping 404. One joint such as 402a is required to be a slip joint if all of the other joints are screwed on. One goal of the present invention is to provide a channel 200 that can be easily taken apart. By providing a slip joint 402a, the piping 404 can be quickly unscrewed and removed from the other angled joints 402. In this fashion, the frame 400 is suspended above the surface of the water the predetermined distance $D_s$. It is to be expressly understood that the frame 400 and the support members 410 can be made of any suitable material and that while the rectangular frame 400 is set on top of individual support members 410 periodically spaced along the elongated length of the channel 200, that any suitable float and frame design could be used under the teachings of the present invention.

The frame 400 is preferably 20 feet long and the frames can be interconnected to be of any suitable length, such as several hundred feet.

As shown in FIGS. 4, 6, and 9, the bottom member 430 is also formed from a one inch diameter PVC pipe with the ends 450 open to the water 40. The anchors 210 are connected to the outer ends 450. One end of 214 of the rope 212 is connected to end 450 of bottom member 430. The rope 212 is passed through the anchor 210 and looped back through a guide 452 (such as a T-joint) so that the opposing end 216 of the rope 212 is connected to seam 444 of the net 440. Bottom member 430 could also be a solid rod such as metal or a series of weights on the like. As illustrated in FIG. 9, a hook latch 900 is provided to enable a maintenance person to quickly release end 216 thereby freeing the channel 200 from the anchor 210.

It is to be expressly understood that while a weighted anchor 210 is shown in the preferred embodiment, any suitable device or apparatus for securing the channel 200 in a predetermined orientation on the surface 60 of the water 40 in the impoundment 10 can be utilized under the teachings of the present invention.

In reference to FIGS. 4 and 10, a length of support strap 1000 is used to secure the frame 400 to the support member 410. In FIG. 10, one such support strap 1000 is shown looped 1010 around the support member 410 in a crisscross 1020 pattern to firmly hold the frame 400 to the support member 410. The ends 1030 of support strap 1000 has a fastener material such as VELCRO which affixes to mating VELCRO material on seam 448. The ends 1030 of support strap 1000 loop around the support member 410 and the frame 400 to firmly hold the channel 200 together. Likewise, the strap 1000 can be quickly released. It is to be expressly understood that while this is the preferred embodiment, any of a number of different approaches could be utilized to secure the frame 400 to the float 410. For example, a U-bolt and clamp could be utilized to bolt the frame 440 to the float 410.

The netting 440 is looped 446 over the frame 400 and is sewn at seam 448 together. Hence, the frame 400 can be easily removed from engagement with the netting 440. Again, while this represents the preferred embodiment, it is to be expressly understood that any suitable means of affixing the netting 440 to the frame 400 could be utilized such as for example through the use of snaps or straps.

As shown in FIG. 9, the bottom member 430 passes through an opening 910 in the mesh 440 and then rests on the bottom of the mesh 440 throughout the elongated length of the channel. In other words, the mesh 440 loops 920 around the bottom of the bottom member 430. Again, while this represents the preferred embodiment of engagement, it is to be expressly understood that other suitable approaches could be utilized such as for example providing straps extending downward from the bottom of the netting 440 and engaging a support member such as 430.

In FIG. 8a, the floating plants 70 are shown being held in the holding region 220. The floating plants 70 as shown in FIG. 8(a) typically float on the surface 60 of the water 40. However, as shown in FIG. 8(b), the plants 70 when dormant fall to the bottom of the holding region 220.

3. Effect of Sunlight

In FIG. 11, rays of sun 1100 are shown hitting a channel 200 at a particular time of day. A shadow 1110 is created on the bottom 20. If the side walls of the channel 200 were rectangular 1120 then the shadow would be larger by a distance 1130 as illustrated. Under the teachings of the present invention while a triangular shape 1140 for the channel is preferred, it is to be expressly understood that any inwardly directed shape such as an arcuate shape 1150 could be utilized to reduce the distance 1130. Indeed, a hemi-spherical shape, or any shape that provides inwardly shaped side walls is preferred over a rectangular or square shape. However, it is to be expressly understood that even a rectangular or square shaped channel 1120 (as shown in FIG. 11) could be utilized under the teachings of the present invention. In the preferred embodiment, the angle 1160 is preferably 60°, but could vary by ±15°. With reference back to FIG. 2, the distance of $D_{cd}$ can suitably vary. It is preferred to maintain $D_w$ at about 5 feet so as to maximize the surface area of the floating plants 70. The distance $D_{cd}$ can vary between 2 and 5 feet, which, in an impoundment where $D_w$ is 6 feet, the bottom of the channel is 4 feet and 1 foot, respectively, from the bottom of the impoundment. Also with reference back to FIG. 3, in the preferred embodiment, in a large lake 10%–20% of the surface of the water has floating channels with 80%–90% of the surface open. In a small impoundment, perhaps as much as 50% or more of the surface has floating channels. Again this is a matter of design choice. Understand that FIG. 3 is an illustration not drawn to scale.

In FIG. 12, the shadow portion 1110 created by the channel 200 with a known width $D_{cw}$ moves as the sun moves throughout the day. For example rays 1200 could be early morning rays, and as the sun moves to set, the shadow 1110 moves to the position 1110a with rays 1200a. Importantly, an inwardly directed shaped channel minimizes the shadow footprint 1110. As the shadow footprint 1 110 moves across the bottom 20, all of the bottom plants receive rays of sunlight during the daytime.

If the channels 200 were to be oriented in the East-West direction as shown in FIG. 13, the bottom plants in shadow A on the bottom 20 would never receive sunlight during the daytime. In this orientation, the bottom dwelling plants 50 in area A would not flourish.

Therefore, the North-South orientation of the channel 200 as shown in FIGS. 11 and 12 represents an optimum delivery of the sunlight to the bottom plants 50 thereby insuring all of the bottom plants will receive rays of sun during the course of the day. It is to be expressly understood that the North-South orientation could vary ±45° about true North under the teachings of the present invention, and that "substantially" when used to refer to the North-South orientation means within ±45° of true North. However, the present invention is not limited to a North-South orientation. Likewise, the triangular shaped holding area 220 provides the maximum exposure of the floating plants 70 (on the surface of the water) with the minimum interference of shading to the bottom plants 50. However, the present invention is not limited to impoundment management systems utilizing solely sunlight, as it is also anticipated that the present invention could be used with artificial lighting alone or in conjunction with sunlight.

With reference back to FIG. 8(a), during harvesting, the channel 200 can be moved in the direction of arrows 800 by a barge abutting against end caps 412 so as to gain access to the bottom plants 50 directly underneath the channel 200. Hence, as shown in FIG. 3, the barge can move in direction of arrows 340 to fully harvest the bottom dwelling plants.

Likewise, the floating plants 70 can be harvested by a maintenance person being in a small boat or barge 350 and by using a rake or a fork to remove up to 70% of the volume of floating rootless plants 70 from each of the channels.

Hence, each channel 200 has an overall shape due to the frame 400 connected to the float members 410 but provides sufficient flexibility for the harvester to harvest the bottom dwelling plants 50 under each channel while permitting maintenance personnel to harvest the floating, rootless plant 70 directly from the open surface of each channel.

4. Impoundment Design

In the preferred embodiment, the first type of rooted bottom dwelling plants can incorporate any variety such as Elodea Densa.

The second type of floating plants can incorporate any variety such as Ceratophyllum Demersum. It is to be expressly understood that the rooted bottom dwelling plants in a particular design of an impoundment can be of different varieties depending upon the type of impurities that need to be removed from the water. Likewise, the second type of rootless floating plants can be of several different varieties of plants. Hence, in one channel one variety of rootless floating plants could be utilized where as in other channels a second variety could be utilized. Based upon the nature and content impurities in the water, the varieties of rootless, floating plants and the numbers of elongated channels 200 can be determined along with the variety of rooted bottom dwelling plants to properly manage and control the impure water in the impoundment.

5. Method of Operation

The method of operation of the present invention, in reference to FIGS. 2 and 3, occurs as follows. Contaminated water is introduced 310 into the impoundment 10. Rootless plants 70 are grown in a plurality of elongated channels 200 floating on the surface 60 of the water 40. After a period of time, the purified water is removed 320 from the impoundment 10. In addition, rooted plants 50 are grown on the bottom 20 of the impoundment 10. Periodically, a barge 350 is used to harvest the floating rootless plants 70 and a barge, not shown, traverses path 340 to periodically harvest the rooted bottom dwelling plants 50. To obtain maximum sunlight benefits, the method of operation preferably orients or arranges the elongated channels in a substantially North-South direction.

The invention has been described with reference to the preferred embodiment. Modifications and alterations will occur to others upon a reading and understanding of this specification. It is intended to include all such modifications and alterations insofar as they come within the scope of the appended claims or the equivalents thereof.

We claim:

1. A method for purifying water in an impoundment comprising:

introducing contaminated water into the impoundment, placing a plurality of elongated channels into the impoundment, said channels floating on the surface of the water, said channels having:
   - (a) a plurality of support members for floating on said surface of said water,
   - (b) a frame connected to said plurality of float members and located above said surface of said water,
   - (c) a holding material connected at least to said frame for forming a holding region with inwardly shaped sides, said holding material extending from said frame into said water a predetermined depth,
   - (d) a lower support member engaging said holding material, and
   - (e) an anchor attached to said lower support member for securing said channel in said impoundment, growing non-rooted plants within said holding region formed holding material of said channels, growing bottom dwelling plants on the bottom of said impoundment below said non-rooted planted, periodically harvesting both said bottom dwelling plants and said non-rooted plants, removing purified water from the impoundment.

2. The method of claim 1 further including the step of arranging said plurality of elongated channels in a substantially North-South configuration.

* * * * *